US005719961A

United States Patent [19]

Normile et al.

[11] Patent Number: 5,719,961
[45] Date of Patent: Feb. 17, 1998

[54] ADAPTIVE TECHNIQUE FOR ENCODER AND DECODER SIGNAL TRANSFORMATION

[75] Inventors: James Oliver Normile, Woodside; Katherine Shu-wei Wang, San Jose; Ke-Chiang Chu, Saratoga; Dulce Beatriz Ponceleon, Palo Alto; Hsi-Jung Wu, Sunnyvale, all of Calif.

[73] Assignee: Apple Computer, Inc., Cupertino, Calif.

[21] Appl. No.: 625,608

[22] Filed: Mar. 29, 1996

Related U.S. Application Data

[63] Continuation of Ser. No. 279,990, Jul. 22, 1994, abandoned.
[51] Int. Cl.$^6$ ..................................................... G06K 9/36
[52] U.S. Cl. ........................................... 382/239; 358/430
[58] Field of Search ............................ 382/232, 233, 382/239, 248, 250; 358/430, 432, 433; 348/403, 404, 405, 420; H04N 1/415

[56] References Cited

U.S. PATENT DOCUMENTS

| 4,225,885 | 9/1980 | Lux et al. ...................... 340/146.3 AG |
| 4,920,414 | 4/1990 | Remus et al. ........................ 358/133 |
| 4,931,869 | 6/1990 | Amor et al. .......................... 358/133 |
| 5,109,451 | 4/1992 | Aono et al. ........................... 382/56 |
| 5,121,216 | 6/1992 | Chen et al. ......................... 358/261.3 |
| 5,129,015 | 7/1992 | Allen et al. ........................... 382/56 |
| 5,150,433 | 9/1992 | Daly ..................................... 382/56 |
| 5,157,743 | 10/1992 | Maeda et al. ......................... 382/56 |
| 5,179,442 | 1/1993 | Azadegan et al. ................... 358/133 |
| 5,227,878 | 7/1993 | Puri et al. ............................ 358/136 |
| 5,233,348 | 8/1993 | Pollman et al. ......................... 341/67 |
| 5,253,053 | 10/1993 | Chu et al. ............................ 358/133 |
| 5,253,075 | 10/1993 | Sugiyama ......................... 358/261.2 |
| 5,267,334 | 11/1993 | Normille et al. ........................ 382/56 |
| 5,299,019 | 3/1994 | Pack et al. .......................... 358/261.3 |
| 5,301,032 | 4/1994 | Hong et al. ......................... 358/261.2 |
| 5,319,724 | 6/1994 | Blonstein et al. ....................... 382/56 |
| 5,327,502 | 7/1994 | Katata et al. .......................... 382/56 |
| 5,374,958 | 12/1994 | Yanagihara ......................... 348/405 |
| 5,396,567 | 3/1995 | Jass ...................................... 382/56 |
| 5,416,523 | 5/1995 | Murakami et al. .................. 358/420 |
| 5,416,606 | 5/1995 | Katayama et al. .................. 358/467 |

OTHER PUBLICATIONS

Clarke, R.J. "Transform Coding of Images", Academic Press, Inc., 1985, pp. 311–318.

*Primary Examiner*—Andrew Johns
*Attorney, Agent, or Firm*—Fenwick & West LLP

[57] ABSTRACT

A signal processing system determines the characteristic of a signal for encoding or decoding by examining and classifying such signal, and then applies a transformation or inverse transformation to such signal. Depending on classification of the signal, various transforms or inverse transforms are applicable adaptively thereto.

21 Claims, 12 Drawing Sheets

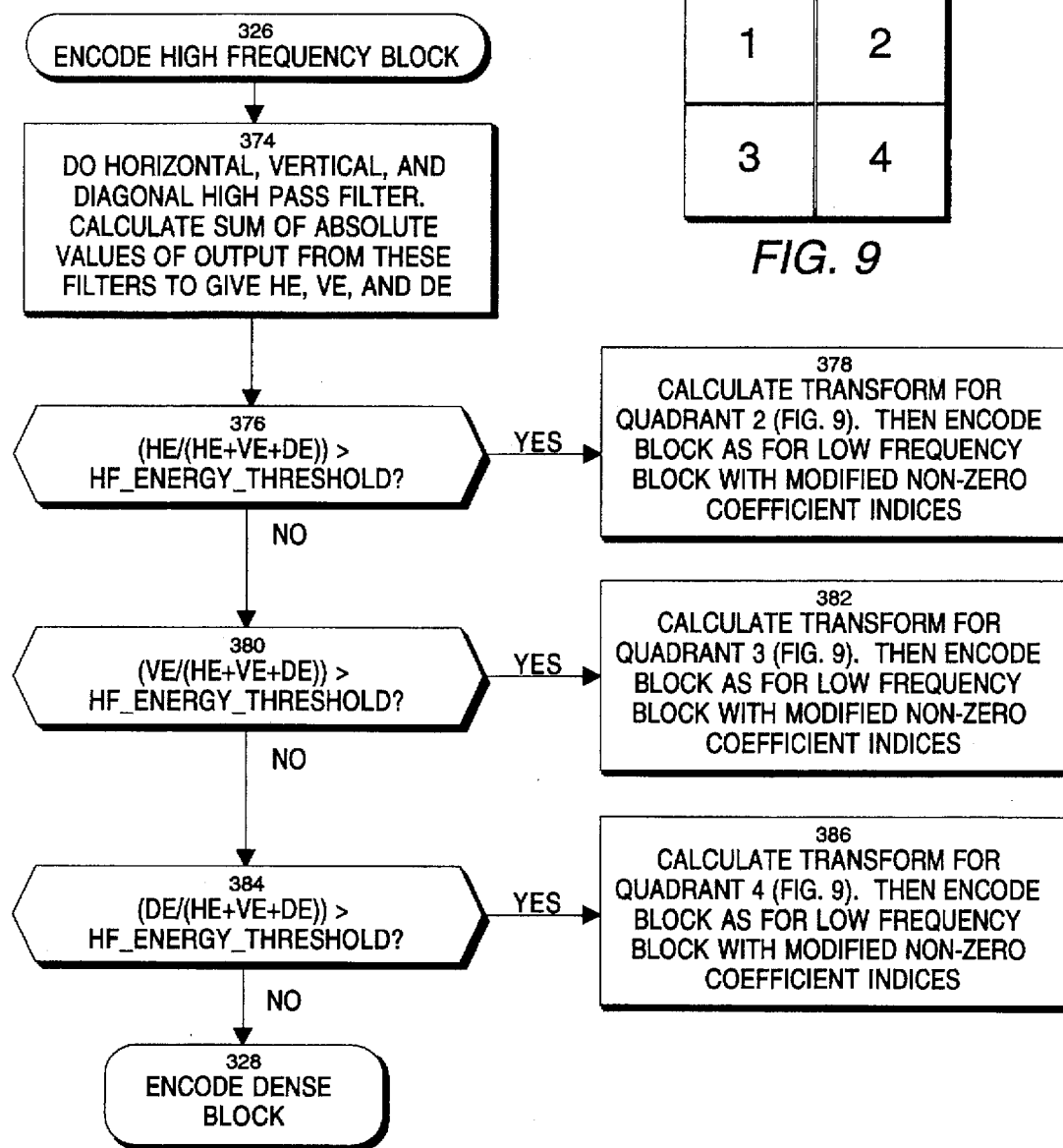
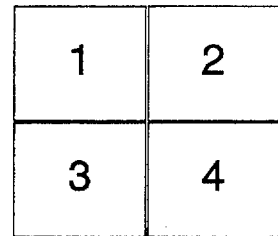
FIG. 9
FIG. 8

ADAPTIVE TECHNIQUE FOR ENCODER AND DECODER SIGNAL TRANSFORMATION

This is a continuation of Prior application Ser. No. 08/279,990 filed on Jul. 22, 1994 now abandoned.

BACKGROUND OF THE INVENTION

1. Field of the Invention

The invention relates to electronic signal processing, particularly to adaptive techniques for transforming encoder or decoder data signals.

2. Description of Background Art

In computer, video, teleconferencing or other electronic systems which process digital signals including image data, there is an increased need to reduce the size of the electronic image representation, particularly for transmission and storage purposes.

Accordingly, various image compression (and decompression) techniques are developed. A number of such techniques conventionally involve linear transformation of the image signal, followed by quantization and coding of transform coefficients. In this way, the quantized and coded signals may be compressed, transmitted or stored, and subsequently decompressed using an inverse set of operations.

For well-known reasons (See: Section 7.7, "Fast Discrete Cosine Transform," in *Transform Codina of Images*, R. J. Clarke, Academic Press (London), 1985), the Discrete Cosine Transform (DCT) has been used for image compression and decompression. However, because such DCT-based image processing is computationally intensive, there is a need to improve its practical performance.

SUMMARY OF THE INVENTION

The invention resides in a digital signal processing system wherein a coefficient transform block signal is classified, and a discrete cosine transformation is applied to the coefficient transform block signal adaptively according to the classification of the coefficient transform block signal.

Further, the transformed signal is evaluated to classify its associated coefficient transform block signal, such that an inverse discrete cosine transformation is applied thereto adaptively according to the classification of the associated coefficient transform block signal.

BRIEF DESCRIPTION OF THE DRAWINGS

FIG. 8 is a generalized flow chart including process steps associated with encode high frequency block 326 portion of FIG. 4.

FIG. 9 is a simplified diagram of four quadrants.

DETAILED DESCRIPTION OF THE PREFERRED EMBODIMENT

Figure 1:
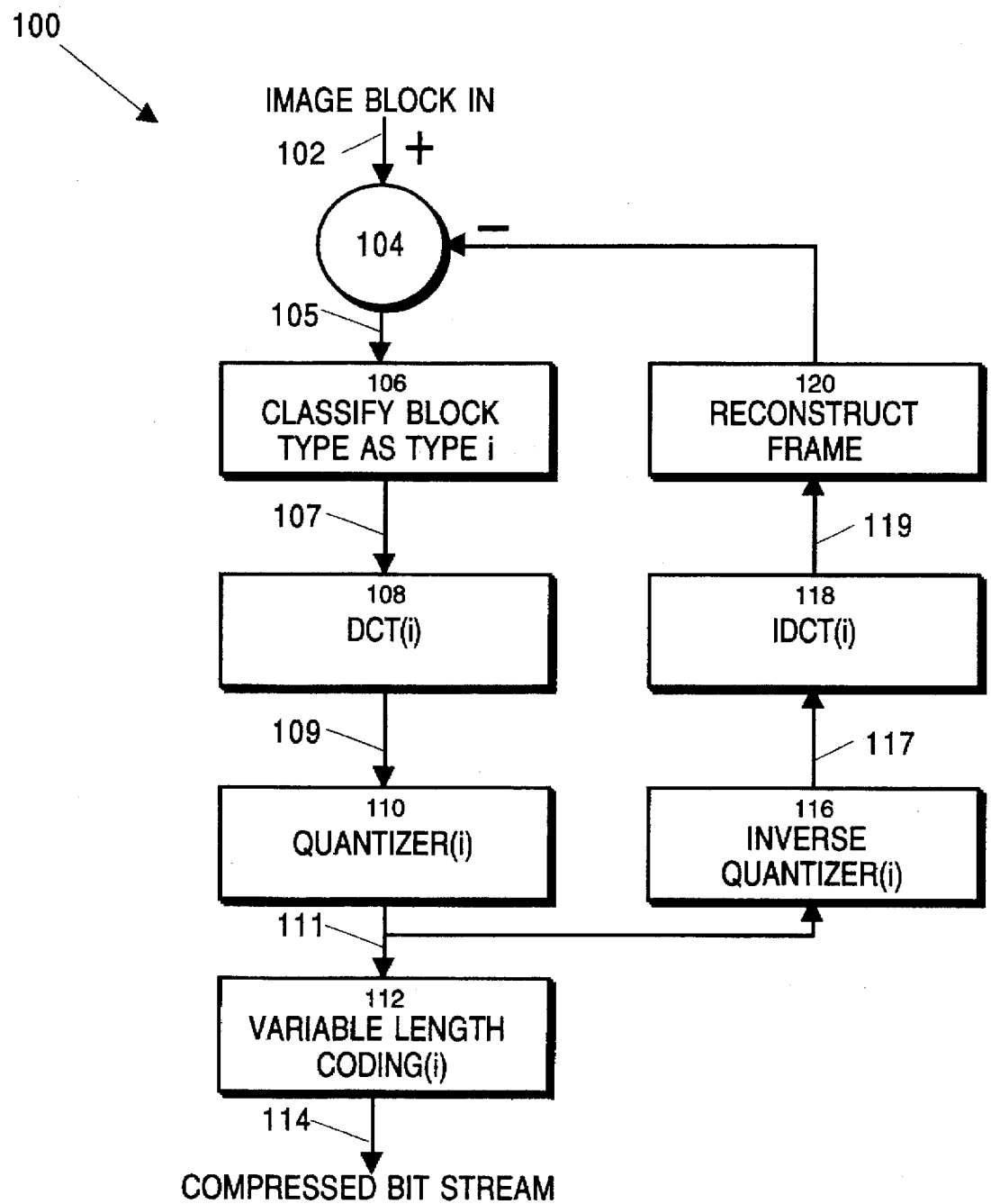
FIG. 1 is a general block diagram of encoder portion 100 of a digital signal processor according to the present invention.
Figure 2:
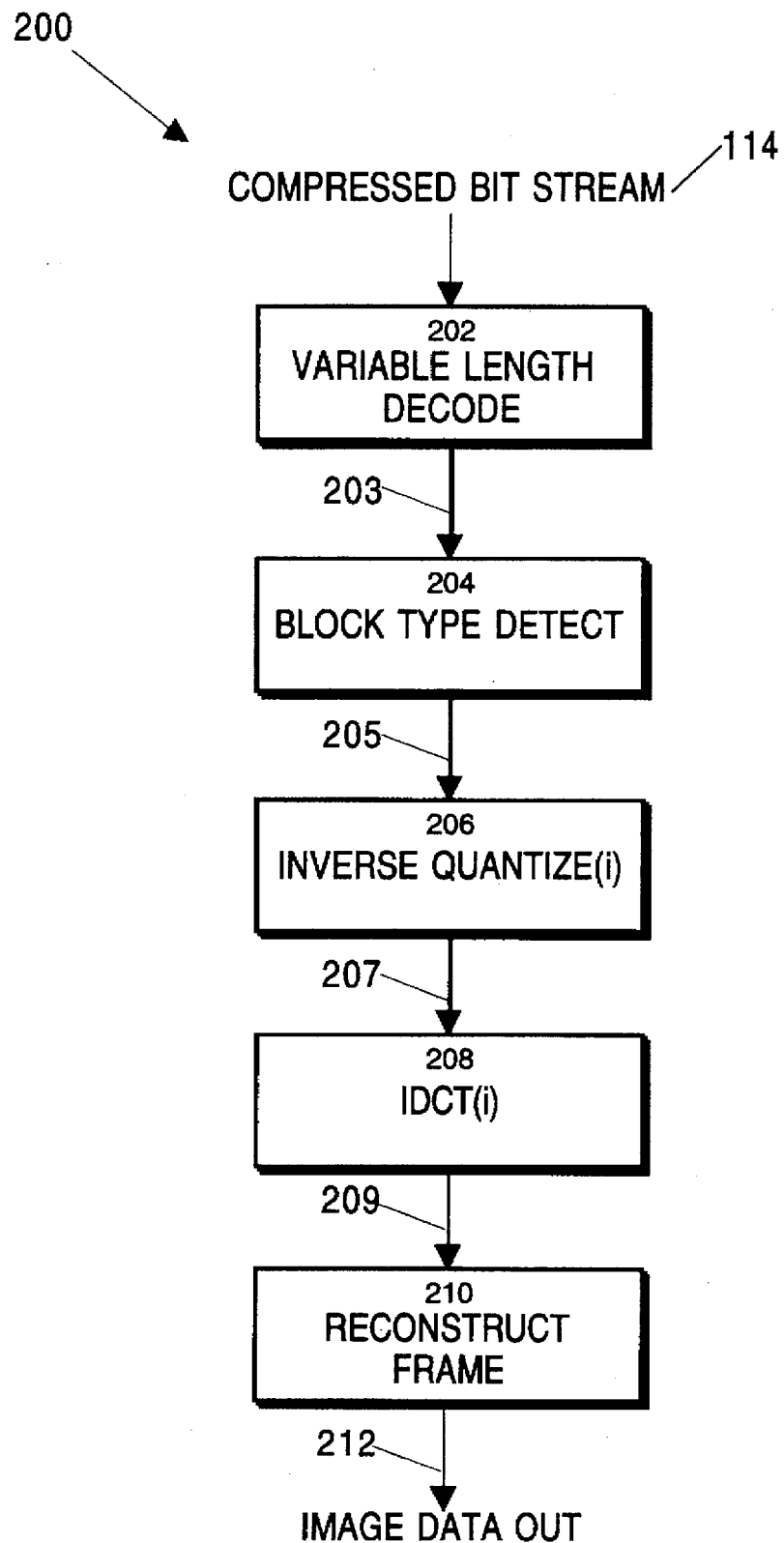
FIG. 2 is a general block diagram of decoder portion 200 of the digital signal processor according to the present invention.

As shown in the block diagrams of FIGS. 1 and 2, the present invention is embodied in an electronic signal processor for receiving, processing and generating digital signals including image data. Although the preferred embodiment implements an adaptive process for signal transformation and inverse transformation in software instructions executed by a conventional computer, equivalent functionality is achieved, fully or in part, using electronic hardware to implement the inventive process.

The preferred signal processing system includes encoder 100, shown in FIG. 1, and decoder 200, shown in FIG. 2. Generally, encoder 100 receives image signal 102 to generate encoded and compressed signal or bit stream 114, which is receivable by decoder 200 for essentially regenerating signal 102 as decoded and decompressed signal or image output data 212.

When operating, encoder 100 receives image signal 102, which is an input digital signal including pixel or image information arranged in a block matrix of coefficient values (e.g., 8 bits×8 bits). Preferably, input signal 102 is provided at summing node 104 in three components using a so-called "YUV" format, which is a conventional transformation from the "RGB" (i.e., Red-Green-Blue) format, as follows:

$$\begin{bmatrix} Y \\ U \\ V \end{bmatrix} = \begin{bmatrix} 0.299 & 0.587 & 0.114 \\ -0.169 & -0.331 & 0.5 \\ 0.5 & -0.419 & -0.081 \end{bmatrix} \begin{bmatrix} R \\ G \\ B \end{bmatrix}$$

Alternately, simplified RGB-to-YUV transformation is determined as follows:

Y=R/4+B/4+G/2

U=(R-Y)/2

V=(B-Y)/2

In accordance with the present invention, classification step 106 is performed on current block signal 105 to examine and thereby classify the characteristic of the incoming block coefficients, as block "i", for example, according to predefined categories or pattern conditions, as described in further detail herein (e.g., "skip block", "DC (i.e., Direct Current) block", "low-frequency block", "high-frequency block" and "dense block").

Thus, by classifying input block signal 105 as characteristically type "i", for example, certain functional portions of encoder portion 100 and decoder portion 200 (i.e., DCT(i) 108, Quantizer(i) 110, Variable-length coding(i) 112, Inverse Quantizer. (i) 116, and IDCT(i) 118 for encoder 100; and Inverse Quantizer(i) 206 and IDCT(i) 208 in decoder 200) are each adaptable or reconfigurable for optimized application to current signal under process.

Generally, block classification 106 is achieved to generate classified signal 107 either by summing absolute value of block elements (i.e., when deciding whether the incoming block should be skipped) or by summing absolute value of local differences between block elements (i.e., when deciding whether to classify the incoming block as low/high frequency or dense block).

Further, it is contemplated that block classification 106 may be achieved by other similar approximation methods, for example, by summing of square values or by taking a weighted measure of energy in the block signal.

Figure 3:
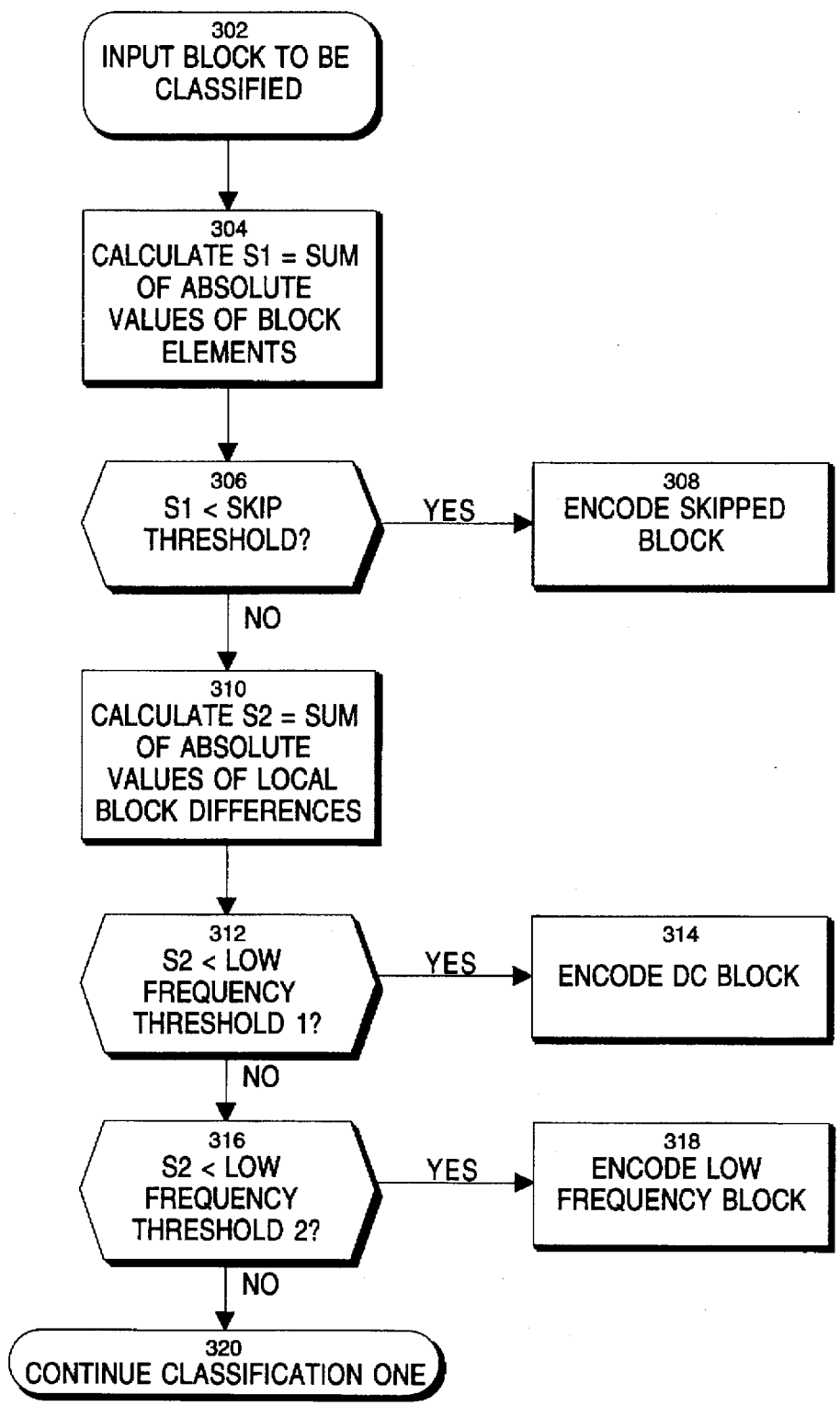
FIGS. 3 and 4 are generalized flow charts including process steps associated with block type classification 106 portion of FIG. 1.
Figure 4:
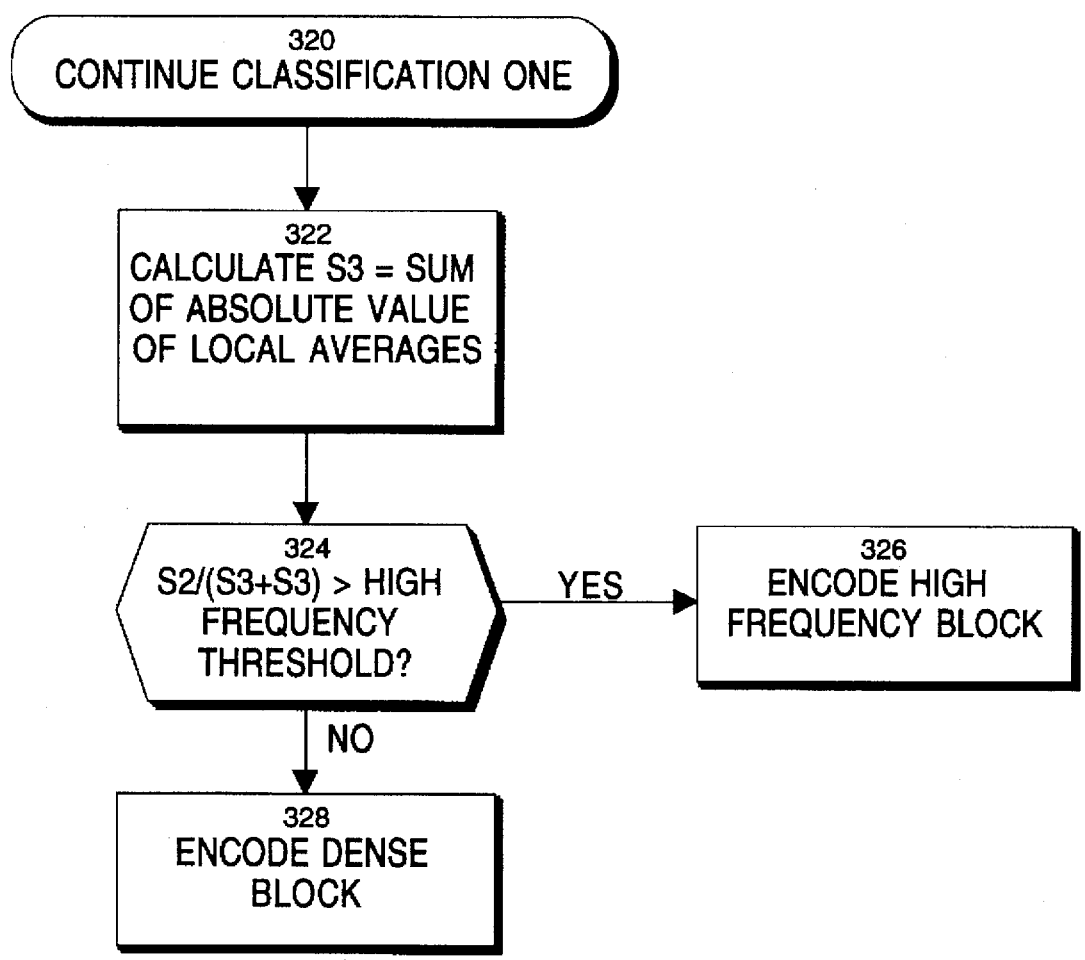

Flow charts of FIGS. 3 and 4 generally set forth process steps associated with block type classification 106 portion of FIG. 1. Initially, input image block 102 is received through summing node 104 for classification 106, 302 as current block signal 105.

In a preferred embodiment of the adaptive inventive technique, which is performed as software instructions that correspond equivalently with flow chart steps provided herein by conventional digital processing or computer equipment, block signal 105 is evaluated to calculate a value (e.g., "S1"), which is a sum of absolute values associated with matrix elements or coefficient values of such block signal 105.

Figure 5:
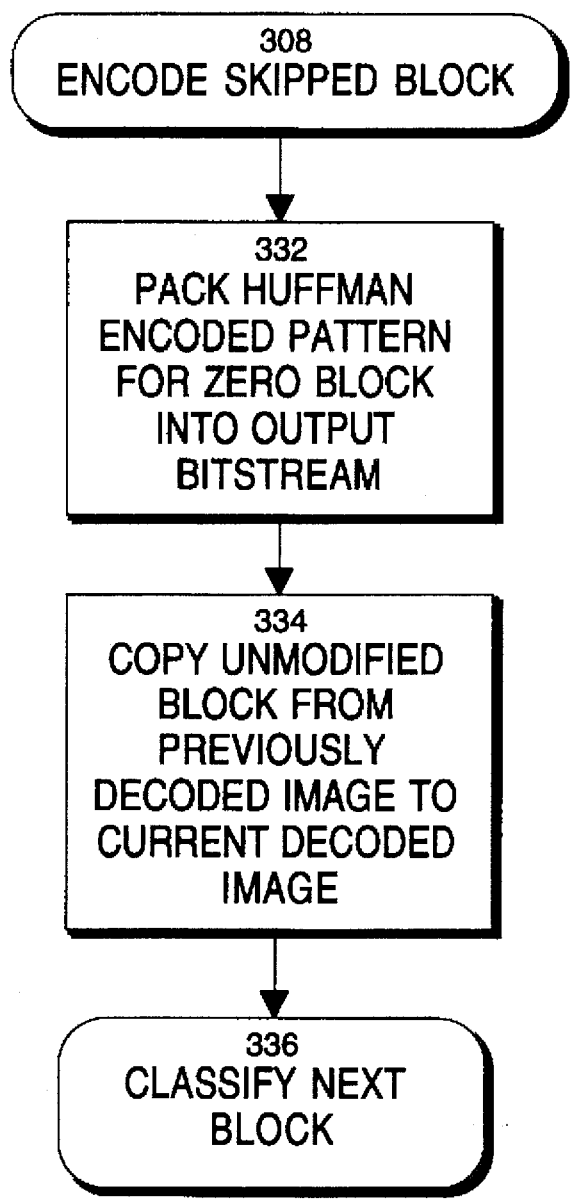
FIG. 5 is a generalized flow chart including process steps associated with encode skipped block 308 portion of FIG. 3.

Logical decision 306 is then performed to compare or determine whether S1 value is less than a predefined or stored "skip" threshold value, in which case, further evaluation 310 of block signal 105 is performed. If S1 value is determined 10 to not exceed the skip threshold, then encoding 308 of block signal 105, thereby classified as skipped block, is performed, as shown in FIG. 5.

However, if S1 value is not less than the skip threshold, then block signal 105 is evaluated further to calculate 310 a value (e.g., "S2"), which is a sum of absolute values associated with differences between local or predefined matrix elements or coefficient values of such block signal 105.

Figure 6:
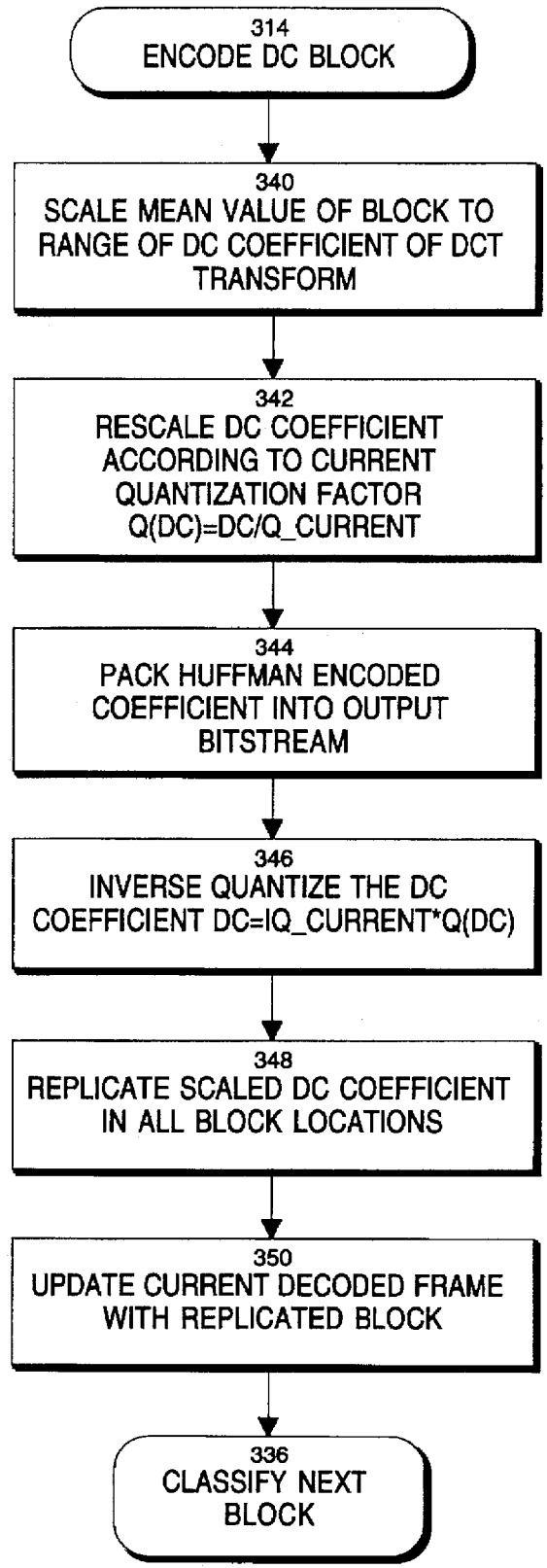
FIG. 6 is a generalized flow chart including process steps associated with encode DC block 314 portion of FIG. 3.

After calculation step 310, logical decision 312 is performed to compare or determine whether S2 value is less than a first predefined or stored low-frequency threshold value, under which encoding 314 of current block signal 105, thereby classified as DC block, is then performed, as shown in FIG. 6.

Figure 7:
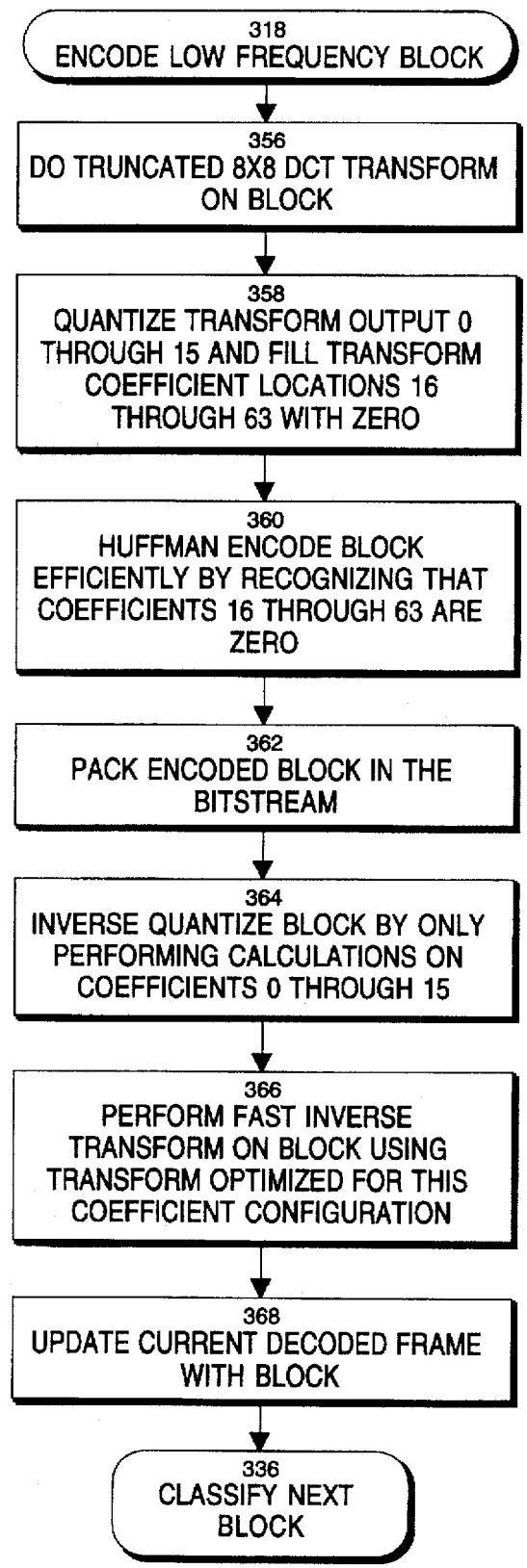
FIG. 7 is a generalized flow chart including process steps associated with encode low frequency block 318 portion of FIG. 3.

If S2 value is determined not to be less than the first low-frequency threshold value, then logical decision 316 is performed to compare or determine whether S2 value is less than a second predefined or stored low-frequency threshold value, under which encoding 318 of current block signal 105, thereby classified as low-frequency block, is then performed, as shown in FIG. 7.

If S2 value is determined not to be less than the second low-frequency threshold value, then classification continues 320. As shown in FIG. 4, a further evaluation of block signal 105 is performed to calculate 322 a value (e.g., "S3"), which is a sum of absolute values of local averages associated with matrix elements or coefficient values of such block signal 105.

After calculation step 322, logical decision 324 is performed to compare or determine whether a calculated value (i.e., S2/(S3+S2)) is greater than a predefined or stored high-frequency threshold value. If the calculated value is so determined to be higher than the high-frequency threshold value, then encoding 326 of current block signal 105, thereby classified as high-frequency block, is then performed, as shown in FIG. 8.

Figure 10:
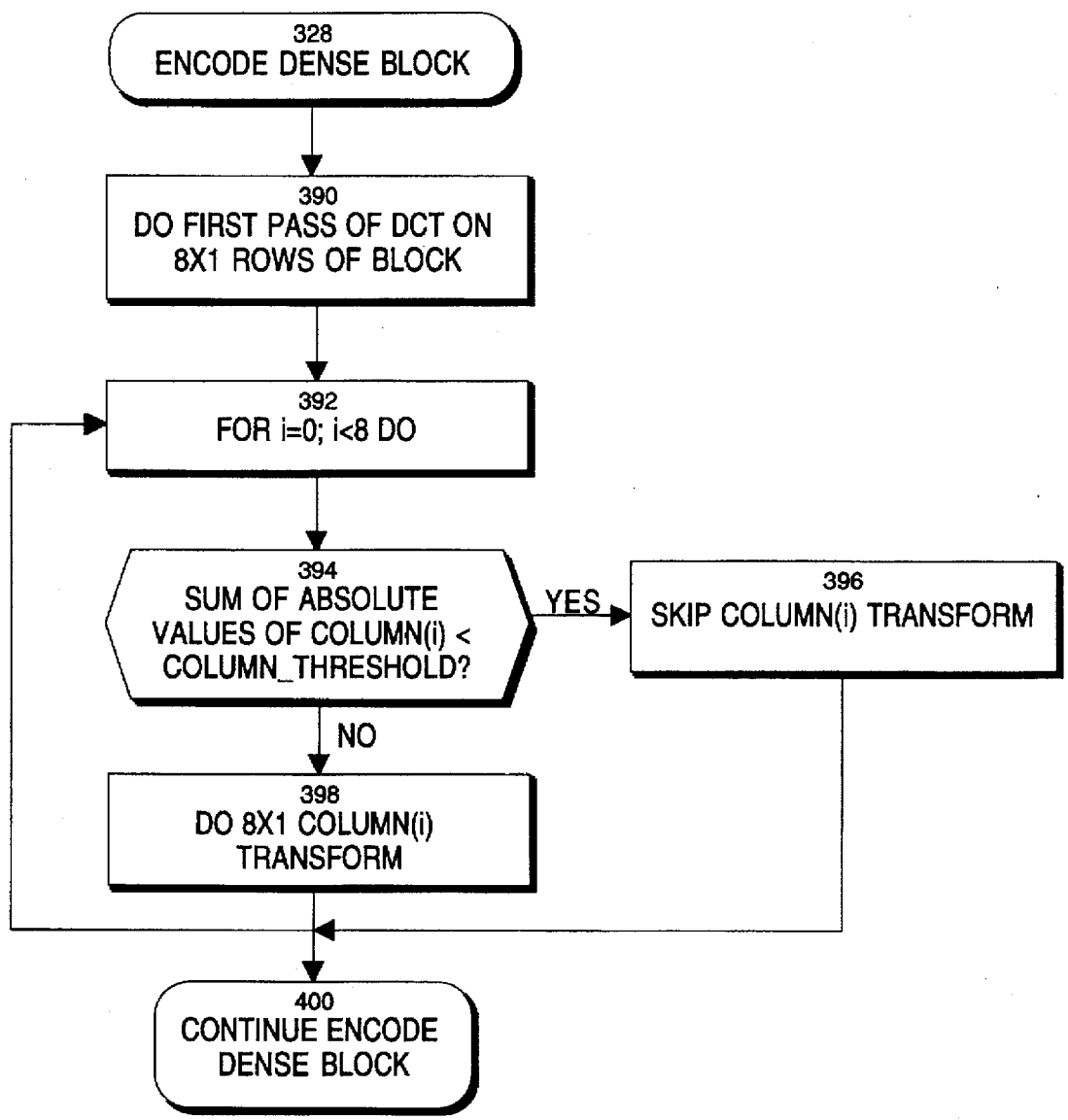
FIGS. 10 and 11 are generalized flow charts including process steps associated with encode dense block 328 portion of FIG. 8.

Otherwise, if the calculated value is determined not to be greater than the high-frequency threshold value, then encoding 328 of current block signal 105, thereby classified as dense block, is then performed, as shown in FIG. 10.

In FIG. 5, skipped block encoding 308 by encoder 100 is shown. Initially, Huffman-encoded pattern representative of a zero-content signal block is provided or "packed" 332 by variable-length coding(i) 112 for generating output signal bit stream 114.

Also, to provide current decoded image at output signal 212, unmodified block signal information may be copied 334 from image signal which was decoded 202 and stored previously. Finally, the block signal is evaluated 106 further to classify 336 the next block.

In FIG. 6, DC block encoding 314 by encoder 100 is shown. Initially, scaling 340 of a mean value of block signal 105 values is performed to within a range of specified DC coefficient value for a particular discrete cosine transform (DCT), such as performable at DCT(i) 108. Then, such DC coefficient value is re-scaled 342 to current quantization factor, preferably provided by quantizer(i) 110 as Q(DC)= DQ/q_current.

Huffman-encoded pattern is then provided or packed 344 by variable-length coding(i) 112 for generating output signal bit stream 114. Inverse quantizer(i) 116 then inverse quantizes 346 the DC coefficient, preferably according to: DC=iq_current*Q(DC).

In this way, scaled DC coefficient value may then be replicated 348 in all block signal matrix locations. Further, current decoded frame is updated 350 with replicated block values. Finally, the block signal is evaluated 106 further to classify 336 the next block.

In FIG. 7, low-frequency block encoding 314 by encoder 100 is shown. Initially, truncated 8×8 DCT transform is performed 356 on current block signal. Transform output signal is then quantized 358 (i.e., 0 through 15), and transform coefficient locations 16 through 63 are filled 358 with zero.

Thus, by recognizing that coefficients 16 through 63 are zero, Huffman encoding by variable-length coding(i) 112 of the current block signal is performed 360 more efficiently.

The encoded block is then packed 362 in compressed bit stream 114.

Inverse quantizer(i) 116 then inverse quantizes 364 current block signal by only performing calculations on coefficients 0 through 15. Next, fast inverse transform at IDCT(i) 118 is performed 366 using transform optimized for current coefficient configuration. Using the current block signal, current decoded frame is thereby updated 368. Finally, the block signal is evaluated 106 further to classify 336 the next block.

In FIG. 8, high-frequency block encoding 326 by encoder 100 is shown. First, horizontal, vertical and diagonal highpass filtering is performed 374, such that a sum may be calculated from absolute values of such filter outputs to provide respectively HE, VE and DE values.

After calculation step 374, logical decision 376 is performed to compare or determine whether a first calculated value (i.e., HE/(HE+VE+DE)) is Greater than a predefined or stored high-frequency threshold value (HF_ENERGY_ THRESHOLD). If first calculated value is Greater than the high-frequency threshold, DCT calculation is performed 378 for a specified matrix quadrant (preferably quadrant "2" as shown in FIG. 9), and current block is encoded as for low-frequency block with modified non-zero coefficient indices.

On the other hand, if first calculated value is not greater than the high-frequency threshold, then logical decision 380 is performed to compare or determine whether a second calculated value (i.e., VE/(HE+VE+DE)) is greater than the high-frequency threshold If second calculated value is Greater than the high-frequency threshold, then DCT calculation is performed 382 for a specified matrix quadrant (preferably quadrant "3" as shown in FIG. 9), and current block is encoded as for low-frequency block with modified non-zero coefficient indices.

On the other hand, if second calculated value is not greater than the high-frequency threshold, then logical decision 384 is performed to compare or determine whether a third calculated value (i.e., DE/(HE+VE+DE)) is greater than the predefined or stored high-frequency threshold. If third calculated value is greater than the high-frequency threshold, then DCT calculation is performed 386 for a specified matrix quadrant (preferably quadrant "4" as shown in FIG. 9), and current block is encoded as for low-frequency block with modified non-zero coefficient indices.

Figure 11:
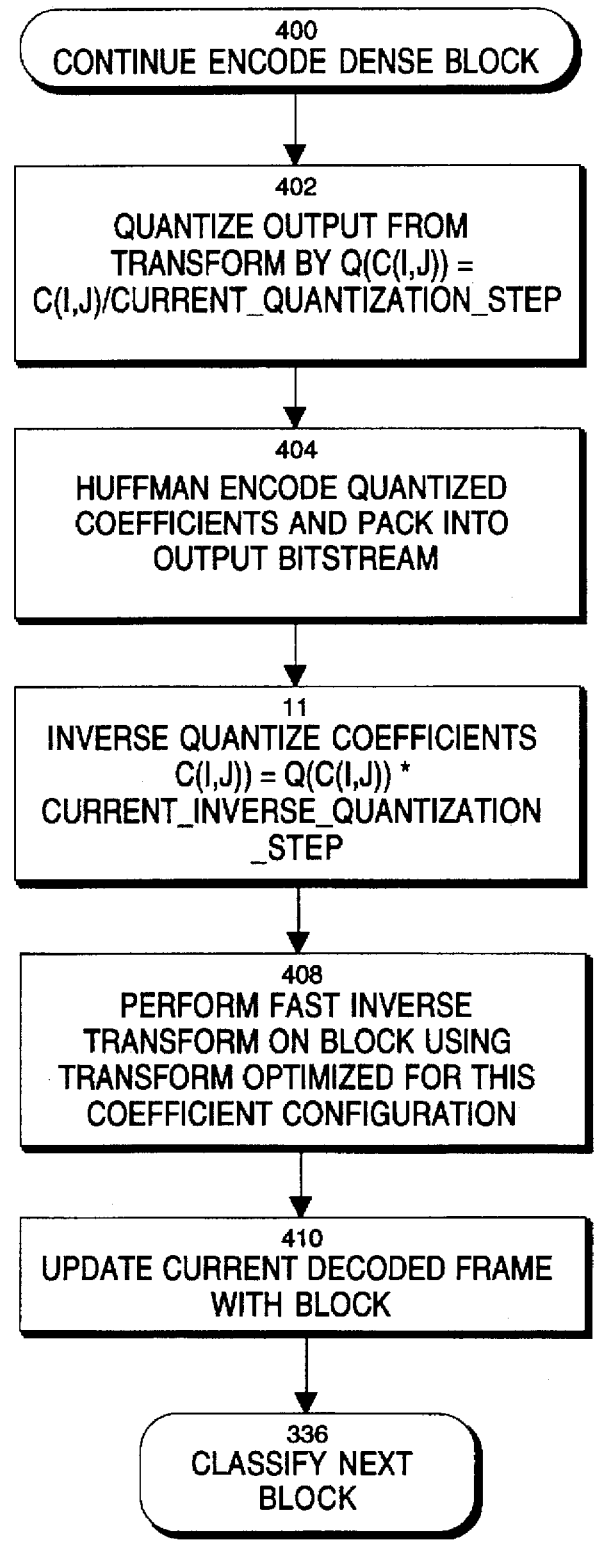

If third calculated value is not greater than the high-frequency threshold, then encoding 328 of current block signal 105, thereby classified as dense block, is then performed by encoder 100, as shown in FIGS. 10 and 11 (as continued there between through step 400).

Initially, first-pass DCT is performed 390 by DCT(i) 108 on 8×1 rows of current block signal. Then, while control condition 392 (i.e., FOR i=0; i<8 DO) applies, logical decision 394 and steps 396, 398 are performed.

In particular, if it is determined that the sum of absolute values of column(i) is less than a specified or stored column threshold value (e.g., COLUMN_THRESHOLD), then column(i) of the applicable transform is skipped 396, and optionally, zero result is written therein instead of calculated values. Otherwise, if such sum is not less than the column threshold value, then 8×1 column(i) transform is performed 398 by DCT(i) 108 thereon.

Next, quantizer(i) 110 quantizes 402 output from such transform by: Q(C(i,j))=C(i,j)/Current_quantization step. The quantized coefficients are Huffman-encoded 404 and provided or packed by variable-length coding(i) 112 for generating output signal bit stream 114. Then, inverse quantizer(i) 116 inverse quantizes 406 coefficients according to:

C(i,j)=Q(C(i,j))*Current_Inverse_quantization_step.

Fast inverse transform is performed 408 by IDCT(i) 118 on current block using transform optimized for current coefficient configuration. Next, current decoded frame is updated 410 with current block information. Finally, the block signal is evaluated 106 further to classify 336 the next block.

Optionally, rate control or time constraint values or signals are applied during classification 106 to regulate the signal processing throughput or extent respectively. These values apply to all classification categories and provide temporal thresholds for limiting the extent to which a particular block category is used.

For example, rate control serves to limit the amount of block information is processed per given time period, and time constraint serves to limit the amount of block information that is processed within a given processing time period. The thresholds are determined based on the desired number of blocks of a particular category.

Depending on the particular classification 106 of input signal 105 (i.e., as type i), a particular discrete cosine transformation (DCT(i)) is applied (or not applied in the case of null transformation condition) adaptively to classified signal 107 to generate transform signal 109.

Also, depending on such classification 106, a particular quantizer function (Quantizer(i), which may provide a scaling function) 110 is applied to transform signal 109 to generate quantized signal 111, and a particular inverse quantizer function (Inverse Quantizer(i)) 116 may be applied to quantized signal 111.

Further, depending on classification 106, optimization is performed such that a particular variable-length coding (Variable-length Coding (i)) 112 is applied to quantized signal 111 to generate compressed bit stream or signal 114, and a particular inverse quantizer function (Inverse Quantizer(i)) 116 is applied to quantized signal 111 to generate inverse quantized signal 117.

In this way, a particular inverse discrete cosine transformation (IDCT(i)) 118 is applied to signal 117 to generate reconstructed signal 119, which is then applied to frame store function 120 for subtractive application to summing node 104 to generate signal 105, which may serve as an error signal.

Thus, in a negative feedback configuration, encoder 100 includes inverse quantizer(i) 116, IDCT(i), and reconstruct frame function 120 effectively to hold coefficient values which correspond with the last or most recent block signal 105.

In FIG. 2, decoder 200 receives compressed bit stream 114, preferably transmitted by encoder 100 of FIG. 1, such that decoder 200 effectively reconstructs original input signal as output signal 212.

Initially, compressed signal 114 is received by variable-length decode 202, which Generates decoded signal 203. Then, in accordance With the present invention, decoder 200 examines signal 203 to detect 204 the type of block associated therewith. For the category types discussed herein, detection 204 is a loss-less process whereby coefficient patterns are examined without causing image data loss (e.g., in skip block condition, no coefficients are used; and in DC block condition, only a single coefficient is used, etc.)

Preferably, classification is performed by block type detect 204 in decoder 200 in essentially the same or equivalent manner as performed by block type classifier 106 in encoder 100. Thus, block type detection 204 (i.e., as block type "i") is performed on signal 203 to generate classified signal 107 therefrom, either by summing absolute value of block elements (i.e., when deciding whether the incoming block should be skipped), or by summing absolute value of local differences between block elements (i.e., when deciding whether to classify received bit stream or block 114 as low/high frequency or dense block.)

Depending on how decoded signal 204, and effectively its associated incoming signal 114, is examined by decoder 200, and thereby classified 204 (i.e., "skip block", "PC block", "low-frequency block", "high-frequency block", "known pattern block" or "dense block"), optimization is performed such that a particular inverse quantize function (Inverse Quantize(i)) 206 is applied to classified signal 205 to generate inverse quantized signal 207. Also, a particular inverse transformation function (preferably inverse discrete cosine transformation, IDCT(i)) 208 is applied to signal 207 to generate signal 209. Finally, inverse transform signal 209 is applied to reconstruct frame step 210 to generate image data out signal 212.

Figure 12:
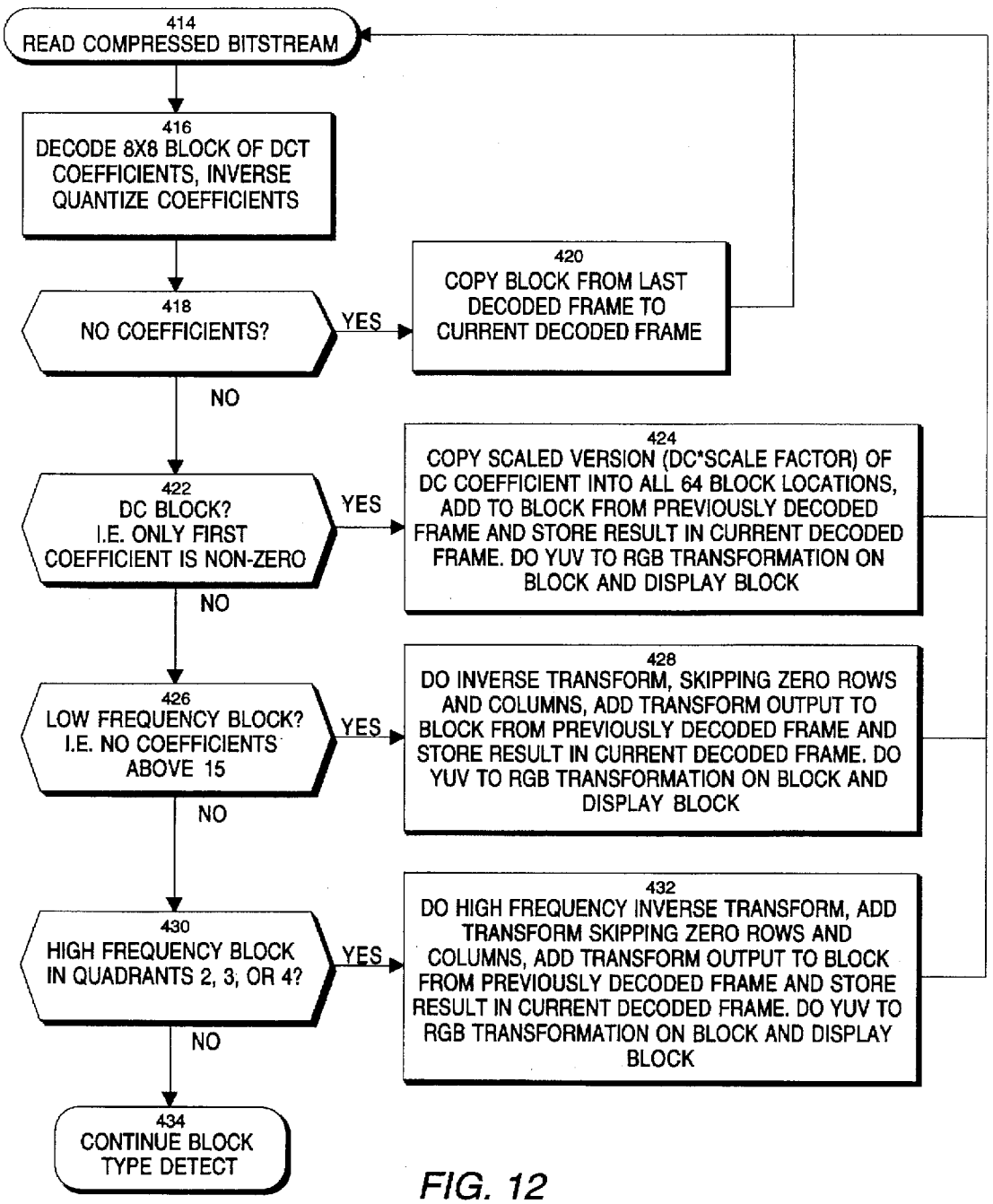
FIGS. 12 and 13 are generalized flow charts including process steps associated with block type detect 204 portion of FIG. 2.
Figure 13:
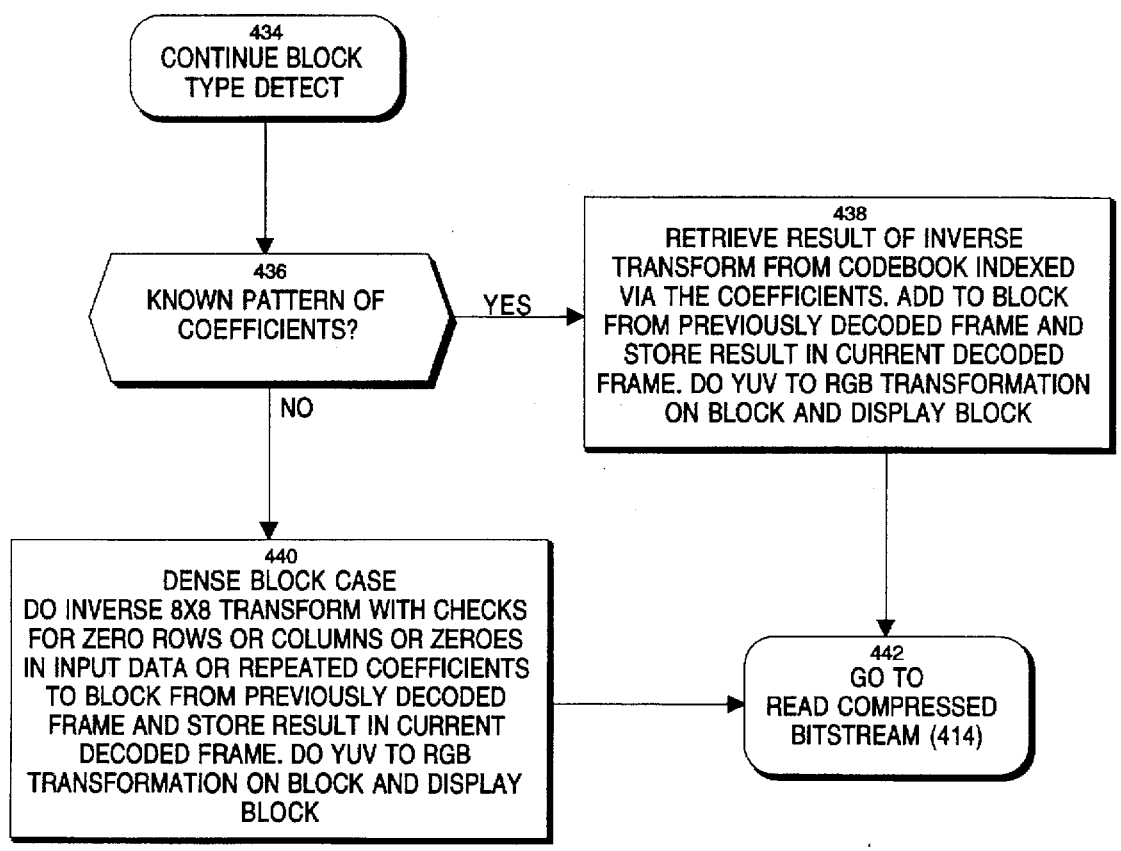

In flow charts of FIGS. 12 and 13, process steps of a preferred implementation for block type detect and classification 204 are shown (as continued there between through step 434). Initially, compressed bit stream 114 is read 414. Variable-length decode 202 is performed 416 on 8×8 block of DCT coefficients and inverse quantize coefficients.

Next, logical decision 418 determines whether there are no coefficients. If there are no coefficients, then block from last decoded frame is copied 420 to current decoded frame at frame reconstruct 210. But if there are coefficients, logical decision 422 examines current block signal to determine whether such signal includes a DC block (i.e., only first coefficient is non-zero).

If it is determined that current block signal includes DC block, then a scaled version (i.e., DC*scale factor) of DC coefficient is copied 424 to all 64 block locations. Also, from previously decoded frame, result is added and stored for current decoded frame. Moreover, a conventional YUV-to-RGB transformation is performed on current block signal, such that the output block signal may be displayed.

If it is determined that current block signal does not include DC block, then logical decision 426 determines whether current block signal includes low-frequency block (i.e., no coefficients above 15).

In this case, if it is determined that there is low-frequency block therein, then inverse transform is performed 428, zero rows and columns are skipped, transform output is added to block from previously decoded frame, and result is stored in current decoded frame. Additionally, a YUV-to-RGB transformation is performed on current block, such that output block is displayed.

On the other hand, if it is determined at logical decision 426 that there is no low-frequency block therein, then logical decision 430 determines whether high-frequency block conditions apply in quadrant 2, 3 or 4, as shown in FIG. 9. If such high-frequency block conditions are determined to apply, then high-frequency inverse transform is performed 432, transform output is added to block from previously decoded frame, and result is stored in current decoded frame. Further, YUV-to-RGB conversion is performed on current block, and such block is displayed.

If it is determined that high-frequency block conditions do not apply in quadrant 2, 3 or 4, then logical decision 436 determines whether there is a known pattern of coefficients. If there is a known pattern of coefficients, then result of inverse transform is retrieved 438 from code book indexed via coefficients. Also, from previously decoded frame, add values to block and store result in current decoded frame. Further, YUV-to-RGB transformation is performed on current block, and such that output block signal may be displayed.

If it is determined that there is no known pattern of coefficients, then dense block condition applies 440. In this case, inverse 8×8 transform is performed with checks for zero rows or columns or zeroes on input data or repeated coefficients to block from previously decoded frame. Further, result is stored in current decoded frame. YUV-to-RGB transformation is also performed on current block, such that output block signal may be displayed. After steps 420, 424, 428, 432 and 438 are performed, compressed bit stream is read 414.

Hence, when signal 203 is classified 204 under "skip block" condition, no or null inverse quantize 206 is performed on classified signal 205 to generate signal 207, and no or null IDCT 208 is performed on signal 207 to generate signal 209. Also, no YUV-to-RGB conversion is performed, and no screen update is performed.

When signal 203 is classified 204 under "DC block" condition, inverse quantize function 206 is scalar, thereby generating signal 207. IDCT 208 is performed on signal 207 by scaling and replicating coefficient values.

When signal 203 is classified 204 under "low-frequency block" condition, inverse quantize function 206 on signal 205 is simplified by using non-zero coefficients to generate signal 207. Then, reduced-computation IDCT 208 is performed on signal 207 to generate signal 209.

When signal 203 is classified 204 under "high-frequency block" condition, inverse quantize function 206 on signal 205 is simplified by using non-zero coefficients to generate signal 207. Then, reduced-computation IDCT 208 is performed on signal 207 to generate signal 209.

When signal 203 is classified 204 under "dense block" condition, inverse quantization function 206 upon signal 205 to generate signal 207 is normal. Fast 8×8 IDCT 208 with zero checks is performed on signal 207 to generate signal 209.

We claim:

1. A computer implemented method of adaptively encoding an image, comprising:

partitioning the image into a plurality of blocks, each block having at least one block coefficient derived from pixel values of the block;

for each block:
classifying the block according to its block coefficients as one of a plurality of discrete block types;
responsive to the block type of the block, dynamically configuring and applying to the block selected operations from group of operations consisting of:
a discrete cosine transform of the block;
a quantization of the block;
a variable length encoding of the block;
an inverse quantization of the block; and,
an inverse discrete cosine transform;

wherein there is at least one block type for which the discrete cosine transform is not selected;

applying to the block each of the selected operation.

2. The computer implemented method of claim 1, further comprising:

establishing at least one rate parameter that limits a number of blocks that may be classified in a fixed time period; and, associating each block type with an amount of time required to classify a block as being of the block type.

3. The computer implemented method of claim 2 wherein classifying the block according to its block coefficients as one of a plurality of discrete block types comprises:

receiving a current value of the rate parameter at about a same time as the block is received; and, classifying the block in accordance with the amount of time indicated by the current value of the rate parameter available to classify the block.

4. A computer implemented method of adaptively encoding an image, comprising:

partitioning the image into a plurality of blocks, each block having at least one block coefficient derived from pixel values of the block;

for each block:
classifying the block according to its block coefficients as one of a plurality of discrete block types, wherein the block types include:
a skip block;
a DC block;
a low frequency block;
a high frequency block;
a dense block;
responsive to the block type of the block, dynamically configuring and applying to the block selected operations from group of operations comprising:
a discrete cosine transform of the block;
a quantization of the block;
a variable length encoding of the block;

an inverse quantization of the block; and,
and inverse discrete cosine transform;

applying to the block each of the selected operation.

5. The computer implemented method of claim 4, wherein responsive to the block being a skip block:

dynamically configuring the variable length encoding to encode a plurality of zero coefficients for the block coefficients.

6. The computer implemented method of claim 4, wherein responsive to the block being a DC block, dynamically configuring and applying to the block the operations of:

scaling a mean of the block coefficients to a range of discrete cosine transform coefficients;

quantizing the scaled mean block coefficient by a first quantization factor to produce a DC coefficient;

variable length encoding of the quantized coefficient;

inverse quantizing the DC coefficient; and replicating the inverse quantized DC coefficient to all block coefficients.

7. The computer implemented method of claim 6 wherein:
the first quantization factor, Q(DC), is:

$$DQ/Q\_current$$

where DQ is the scaled mean block coefficient;

Q_current is a current value of the first quantization factor; and the inverse quantization quantizes the DC coefficient by:

$$DC = iQ\_current * Q(DC)$$

where iQ_current is a current value of an inverse quantization factor.

8. The computer implemented method of claim 4 wherein responsive to the block being a low frequency block, dynamically configuring and applying to the block the operations of:

a truncated discrete cosine transformation on only a number of the block coefficients less than all of the block coefficients, such that a remaining number of block coefficients are not transformed;

quantizing only the selected number of block coefficients, and replacing the remaining number of block coefficients with zero values;

variable length encoding only the non-zero quantized block coefficients;

inverse quantizing the block using only the non-zero quantized block coefficients; and, performing a fast inverse discrete cosine transformation on the inverse quantized block.

9. The computer implemented method of claim 4 wherein responsive to the block being a high frequency block, dynamically configuring and applying to the block the operations of:

dividing the block into four quadrants, each quadrant having a number of block coefficients;

selecting one of the quadrants;

performing a truncated discrete cosine transformation on only the block coefficients in the selected quadrant;

quantizing only the transformed block coefficients, and replacing the remaining number of block coefficients with zero values;

variable length encoding only the non-zero quantized block coefficients;

inverse quantizing the block using only the non-zero quantized block coefficients; and, performing a fast inverse discrete cosine transformation on the inverse quantized block.

10. The computer implemented method of claim 9, wherein selecting one of the quadrants comprises:

filtering the block with a horizontal high pass filter to determine a horizontal high pass filter output;

filtering the block with a vertical high pass filter to determine a vertical high pass filter output;

filtering the block with a diagonal high pass filter to determine a diagonal high pass filter output;

summing absolute values of the horizontal, vertical, and diagonal high pass filter outputs to produce a summed filter output;

selecting a first quadrant where the ratio of the horizontal high pass filter output to the summed filter output is greater than a first threshold;

selecting a second quadrant where the ratio of the vertical high pass filter output to the summed filter output is greater than the first threshold; and, selecting a third quadrant where the ratio of the diagonal high pass filter output to the summed filter output is greater than the first threshold.

11. The computer implemented method of claim 4, wherein responsive to the block being a dense block, dynamically configuring and applying to the block the operations of:

a discrete cosine transformation on only those rows of the block coefficients having only non-zero block coefficients;

a discrete cosine transformation on only those columns of the block coefficients having only non-zero block coefficients;

quantizing the transformed block coefficients;

variable length encoding the quantized coefficients;

inverse quantizing the encoding coefficients; and performing a fast inverse discrete cosine transformation on the inverse quantized block coefficients.

12. The computer implemented method of claim 4 wherein classifying the block according to its block coefficients as one of a plurality of discrete block types comprises:

classifying the block as a skip block if a first sum of absolute values of the block coefficients is less than a first energy threshold;

classifying the block as a DC block if a second sum of absolute values of the differences between block coefficients of local blocks is less than second energy threshold;

classifying the block as a low frequency block if the second sum is less than a third energy threshold;

classifying the block as a high frequency block if ratio:

$$S2/(S2+S3)$$

is greater than a fourth energy threshold, where S2 is the second sum, and S3 is a sum of absolute values of local averages of the block coefficients; and, classifying the block as a dense block if the block is not a skip block, a low frequency block, or a high frequency block.

13. An image processing method for processing a compressed image, comprising the steps of:

receiving a compressed bit stream of the image;

decoding the compressed bit stream to generate a decoded bit stream having a plurality of inverse quantized DCT coefficients;

inverse quantizing the decoded bit stream adaptively according to the DCT coefficients to generate a plurality quantized DCT coefficients for a block in the image;

classifying the block according the number and placement of the DCT coefficients in the block as one of a plurality of discrete block types;

responsive to the block type of the block, dynamically configuring according to the block type selected operations from group of operations comprising:
an inverse quantization of the block coefficients; and,
an inverse discrete cosine transform;

applying to the block each of the selected operations.

14. The computer implemented method of claim 13, wherein the block types include:
a skip block;
a DC block;
a low frequency block;
a high frequency block; and
a dense block.

15. The computer implemented method of claim 14, wherein classifying a block as one a plurality of block types comprises:

classifying the block as a skip block if there are no DCT coefficients in the bit stream;

classifying the block as a DC block if only a first DCT coefficient of the DCT coefficients is non-zero;

classifying the block as a low frequency block if all of the DCT coefficients are below a predetermined threshold; and, classifying the block as a high frequency block if non-zero DCT coefficients are located only in a single quadrant of the block.

16. The computer implemented method of claim 15 wherein classifying the block further comprises:

classifying the block as a dense block if the block is not a skip block, a DC block, a low frequency block, or a high frequency block.

17. The computer implemented method of claim 14, wherein the block is a first block, and the image is a first image, wherein responsive to the block type of the first block being a skip block, copying a second block in a second image previous to the first image to the first image.

18. The computer implemented method of claim 14, wherein responsive to the block type of the block being a DC block, dynamically configuring and applying to the block the operations of:

replacing all block coefficients with a scaled, inverse quantized DC coefficient;

combining the block coefficients in the block with block coefficients in a corresponding block in a previous image; and, converting the combined block coefficients to RGB values.

19. The computer implemented method of claim 14, wherein responsive to the block type of the block being a low frequency block, dynamically configuring and applying to the block the operations of:

performing the inverse discrete cosine transform on rows of block coefficients having only non-zero values;

performing the inverse discrete cosine transform on columns of block coefficients having only non-zero values;

combining the block coefficients in the block with block coefficients in a corresponding block in a previous image; and, converting the combined block coefficients to RGB values.

20. The computer implemented method of claim 14, wherein responsive to the block type of the block being a high frequency block, dynamically configuring and applying to the block the operations of:

performing the inverse discrete cosine transform on rows of block coefficients having only non-zero values;

performing the inverse discrete cosine transform on columns of block coefficients having only non-zero values;

combining the block coefficients in the block with block coefficients in a corresponding block in a previous image; and, converting the combined block coefficients to RGB values.

21. The computer implemented method of claim 14, wherein responsive to the block type of the block being a dense frequency block, dynamically configuring and applying to the block the operations of:

inverse quantizing on the block coefficients;

performing a fast discrete cosine transformation on only those row or columns of the inverse quantized block coefficients having non-zero values;

combining the block coefficients in the block with block coefficients in a corresponding block in a previous image; and, converting the combined block coefficients to RGB values.

* * * * *